(12) United States Patent
Jacquemet et al.

(10) Patent No.: US 6,235,361 B1
(45) Date of Patent: *May 22, 2001

(54) POLYMER-COATED METAL SURFACES

(75) Inventors: Régis Jacquemet, Evreux; Patrice Perret, Serquigny, both of (FR)

(73) Assignee: Atofina (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/739,073

(22) Filed: Oct. 28, 1996

(30) Foreign Application Priority Data

Oct. 26, 1995 (FR) .................................... 95 12637

(51) Int. Cl.$^7$ .................................... B29D 22/00
(52) U.S. Cl. .................... 428/36.9; 428/35.7; 428/36.91; 428/418
(58) Field of Search ................. 428/36.9, 418, 428/36.91, 35.7

(56) References Cited

U.S. PATENT DOCUMENTS

| | | | |
|---|---|---|---|
| Re. 30,006 | 5/1979 | Sakayori et al. . | |
| 4,060,655 | * 11/1977 | Johannes et al. | 428/35 |
| 4,211,595 | * 7/1980 | Samour | 156/187 |
| 4,213,486 | * 7/1980 | Samour et al. | 138/143 |
| 4,481,239 | * 11/1984 | Eckner | 428/36 |
| 4,606,953 | * 8/1986 | Suzuki et al. | 428/418 |
| 4,680,076 | * 7/1987 | Bard | 523/435 |
| 4,732,632 | 3/1988 | Pieslak et al. . | |
| 4,762,882 | * 8/1988 | Okano et al. | 525/74 |
| 4,997,685 | 3/1991 | Pieslak et al. . | |
| 5,178,902 | * 1/1993 | Wong et al. | 427/470 |
| 5,300,336 | * 4/1994 | Wong et al. | 428/35.9 |
| 5,654,104 | * 8/1997 | Yoshizaki et al. | 428/461 |

* cited by examiner

*Primary Examiner*—Judy M. Reddick
(74) *Attorney, Agent, or Firm*—Pennie & Edmonds LLP

(57) ABSTRACT

The present invention relates to a metal surface coated with a thermoplastic polymer, the coating exhibiting a peel strength at 130° C. (according to DIN 30 670) which is higher than 400 N/5 cm. This value can be obtained by placing between the metal and the thermoplastic a layer of epoxy resin of Tg higher than 120° C. against the metal and then a layer of polypropylene-based binder. The invention is particularly useful for coating the external surface of pipes.

14 Claims, No Drawings

POLYMER-COATED METAL SURFACES

TECHNICAL FIELD

The present invention relates to polymer-coated metal surfaces and more particularly to pipes the external surface of which is coated with a thermoplastic polymer. The Applicants have discovered thermoplastic polymer coatings which exhibit a peel strength at 130° C. which is higher than 400 N/5 cm. A means of obtaining this peel strength is, for example, to place between the metal and the thermoplastic a layer of epoxy resin which has a glass transition temperature higher than 120° C. and a layer of polypropylene-based binder, the layer of epoxy resin being against the metal.

BACKGROUND OF THE INVENTION

U.S. Pat. No. 4,606,953 to Suzuki et al. (and DE 3422920) describes coatings for steel pipes, including successively a layer of epoxy resin, a layer of grafted polypropylene and finally an external layer of a mixture of polypropylene and of a polypropylene/polyethylene block copolymer. The glass transition temperature ($T_g$) of the epoxy resin is between 80 and 94° C. These coatings are suitable for hot water at 90° C.

U.S. Pat. Re. No. 30,006 to Sakayori et al. describes coatings for steel pipes including successively an epoxy resin and a polyethylene modified by grafting or copolymerization with maleic anhydride. Nothing is written concerning the $T_g$ of the epoxy resin; however, the polyethylene does not make it possible to work above 80° C. Thus, the prior art has not described any coating which has a high peel strength at 130° C. like that of the invention.

SUMMARY OF THE INVENTION

The present invention is therefore a metal surface coated with a thermoplastic polymer, the coating exhibiting a peel strength at 130° C. (measured according to DIN standard 30 670) which is higher than 400 N/5 cm.

DETAILED DESCRIPTION OF THE INVENTION

The metal surface may be of any kind; however, the invention is particularly useful for the external surface of pipes, it being possible for these pipes to have an external diameter, for example, of up to 0.8 m or up to 1.5 m and a thickness of 2 to 25 mm.

The thermoplastic polymer may be of any kind, provided that its working temperature is higher than or equal to 130° C. and preferably between 130 and 150° C.

To give an example, polypropylene, polyamides and polyamide blends may be mentioned, it being possible for these polymers to be filled with glass fibers. Polypropylene is intended to mean propylene homopolymers and the copolymers of propylene with at least one alpha-olefin and with propylene predominating by weight. This alpha-olefin is, for example, ethylene.

Polyamide is intended to mean the products of condensation:

- of one or more amino acids such as aminocaproic, 7-aminoheptanoic, 11-aminoundecanoic and 12-aminododecanoic acids or of one or more lactams such as caprolactam, oenantholactam and lauryllactam;
- of one or more salts or mixtures of diamines such as hexamethylenediamine, dodecamethylenediamine, metaxylylenediamine, bis-p-aminocyclohexylmethane and trimethylhexamethylenediamine with diacids such as isophthalic, terephthalic, adipic, azelaic, suberic, sebacic and dodecanedicarboxylic acids; or
- of mixtures of certain monomers, which results in copolyamides.

Polyamide mixtures may be employed. PA-6 and PA-6,6 are advantageously employed.

A polyamide blend within the meaning of the invention is intended to mean the mixtures of polyamide which are in the form of polyamide matrix in which nodules of a polymer (A) or of a rubber are dispersed, the blend having to exhibit a working temperature as indicated above.

By way of example of polymer (A) there may be mentioned the above polypropylene, crosslinked polyethylenes or crosslinked mixtures of (i) ethylene copolymers including maleic anhydride and of (ii) ethylene copolymers including glycidyl methacrylate.

As example of rubbers it is possible to mention: styrene-butadiene (SBR), nitrile-butadiene (NBR), natural rubber, polyisoprene, polybutadiene, butyl rubber, styrene-butadiene-styrene (SBS) block copolymers, styrene-isoprene-styrene (SIS) copolymers and styrene-ethylene/butene-styrene (SEBS) copolymers.

The polymer (A) and the rubber may optionally carry functional groups to facilitate compatibilizing with the polyamide. These functional groups can be obtained by grafting at least one unsaturated carboxylic acid, an anhydride and the derivatives of these acids and anhydrides. By way of example of carboxylic acids it is possible to mention: acrylic acid, methacrylic acid, maleic acid, fumaric acid, itaconic acid, crotonic acid, itaconic anhydride, nadic anhydride, maleic anhydride and substituted maleic anhydrides such as, for example, dimethylmaleic anhydride.

By way of examples of derivatives it is possible to mention: salts, amides, imides and esters, such as sodium mono- and dimaleate, acrylamide, maleimide and dimethyl fumarate. The grafting processes are known to a person skilled in the art.

The formation of the polyamide matrix can also be facilitated by adding a compatibilizing agent to the mixture of polyamide and of polymer (A) or of rubber. This product is known per se. To give an example it is possible to mention: polypropylene grafted with an unsaturated carboxylic acid, a carboxylic acid anhydride or their derivatives. These products can be chosen from the products of grafting which are described above.

The compatibilizing agent may also be a mixture of grafted polypropylene and of an elastomer such as an EPR or EPDM rubber.

Where polypropylene is concerned, the compatibilizing agent is advantageously an ethylene/propylene copolymer with propylene predominating and grafted with a product which has a site that is reactive with amines and then condensed with polyamides or polyamide oligomers which have a single amine end. These compatibilizing agents and the corresponding polyamide blends are described in U.S. Pat. No. 5,342,886 to Glotin et al., the content of which is incorporated into the present application.

The quantity of polyamide forming the matrix of these polyamide blends may be between 55 and 95% by weight of the combination of the polyamide and of the polymer (A) or of the rubber. These polyamide blends can be manufactured by the usual melt-blending techniques (twin screw, Buss or single screw).

The peel strength at 130° C. is at least 400 N/5 cm; it can reach 650 N/5 cm if the thermoplastic is filled with glass fibers. At 150° C. the peel strength is higher than 180 N/5 cm; it can reach 200 N/5 cm in the case of polyamides or polyamide blends and 350 N/5 cm in the case of thermoplastics filled with glass fibers The Applicants have discovered that a means for obtaining these peel strengths is, for example, to place between the metal and the thermoplastic a layer of epoxy resin which has a glass transition temperature higher than 120° C. and a layer of binder based on functionalized polypropylene, the layer of epoxy resin being against the metal.

The present invention also relates to this metal surface thus coated.

The basis of the epoxy resins is described, for example, in the Kirk-Othmer Encyclopedia of Chemical Technology, Vol. 9—pages 267–289, 3rd edition. It suffices to choose a resin which has the required $T_g$. These resins are in most cases polyglycidyl ethers of a polyphenol.

The following are advantageously employed:
  products of condensation of bisphenol A and of epichlorohydrin;
  epoxy-cresol novolak (ECN) resins;
  epoxy phenol novolaks;
  resins derived from bisphenol F;
  derivatives of polynuclear phenols and of glycidyl ethers;
  cycloaliphatic resins;
  resins derived from aromatic amines such as:
    derivatives of tetraglycidylmethylenedianiline,
    derivatives of triglycidyl-p-amino-phenol,
    derivatives of triazines such as triglycidyl isocyanurate;
  resins derived from hydantoin.

The resins employed in the present invention are crosslinkable between 180 and 250° C. Crosslinking can be carried out, for example, with amines such as dimethylethanolamine and methylenedianiline or amides such as dicyandiamide, or else phenolic resins.

These resins may include additives such as silicones, pigments such as titanium dioxide, iron oxides, carbon black, and fillers such as calcium carbonate, talc or mica.

The gel time is advantageously between 20 and 30 seconds.

Gel time is defined by Association Francaise de Normalisation (AFNOR) standard NFA 49-706. It is the time necessary to produce a rapid increase in the viscosity at a determined temperature.

The $T_g$ is advantageously higher than 150° C. These resins can take the form of powder or liquid which is sprayed onto the metal surface, which is degreased, sandblasted and heated beforehand.

The polypropylene-based binder denotes, for example, compositions including essentially polypropylene functionalized by grafting with at least one unsaturated carboxylic acid, an unsaturated carboxylic acid anhydride or derivatives of these acids and anhydrides. These products have already been referred to above. A polypropylene of melt index (MI) 0.1 to 10 g/10 min at 230° C. under 2.16 kg is advantageously grafted with maleic anhydride in the presence of initiators such as peroxides. The quantity of maleic anhydride which is actually grafted may be between 0.01 and 10% by weight of the grafted polypropylene. The grafted polypropylene may be diluted with polypropylene, EPR and EPDM rubbers or copolymers of propylene and of an alpha-olefin. According to another alternative form it is also possible to perform a cografting of a mixture of polypropylene and of EPR or of EPDM, that is to say to add an unsaturated carboxylic acid, an anhydride or their derivatives to a mixture of polypropylene and of EPR or of EPDM in the presence of an initiator.

The thickness of the layer of epoxy resin may be between 20 and 400 μm and preferably between 50 and 150 μm.

The thickness of the binder layer may be between 100 and 500 μm and preferably between 200 and 350 μm.

The thickness of the layer of thermoplastic polymer may be between 0.5 and 5 mm and preferably 1.5 and 3 mm.

It would not constitute a departure from the scope of the invention to add fillers, anti-UV agents, pigments, stabilizers, flame retardants and the like to the epoxy resin, to the binder, to the thermoplastic polymer or to any combination of the above.

The present invention also relates to a process for the manufacture of these coated surfaces. The metal surface is first of all degreased, sandblasted, and then heated. The epoxy resin is deposited in liquid form, or by spraying or electrostatic spraying if it is a powder, onto the metal surface which is heated to about 200–240° C. After approximately 20 seconds, that is to say shortly before the end of the gel time, before the resin is crosslinked, so that epoxide functional groups remain for reacting with the graft units of the binder, the binder is deposited either by spraying if it is a powder, or by coating or rolling. The thermoplastic polymer is then deposited in the same way.

Where the external surface of metal pipes is concerned, the procedure is the same in the case of the epoxy resin and then the binder is either deposited by spraying if it is available as a powder or, in most cases, extruded in an annular die arranged concentrically around the pipe. The binder can also be extruded in a flat die producing a continuous tape which is wound around the pipe, for example by virtue of the rotation of the pipe about itself. The thermoplastic is deposited in the same way.

The present invention also relates to a coated metal surface including successively a layer of epoxy resin placed against the metal and having a glass transition temperature higher than 120° C., a layer of binder based on polypropylene modified by grafting and a layer of thermoplastic polymer.

EXAMPLES

In the following examples the products hereinafter are employed:

EUROKOTE 714-31PP epoxy resin denotes an epoxy resin which has a $T_g$=105° C. and is supplied by the company Bitumes Spéciaux and has the following characteristics:

Density at 23° C. (NFT 30-043): 1.5±0.05 g/ml

Moisture content (IBS 319)≦0.50%

Particle size (IBS 316):

median diameter 38±4 μm oversize at 96 μm<10%

$T_g$ (NFA 49-706): 105°±5° C.

Gel time 80±10 seconds at 180° C.

EPOXY P405/06 epoxy resin denotes an epoxy resin which has a $T_g$=160° C. and is supplied by the company Bitumes Spéciaux. It has a gel time of 25±5 seconds at 210° C.

EPOXY 500 618 epoxy resin denotes an epoxy resin which has a $T_g$=150° C. and is supplied by Akzo and has a gel time of 25±5 seconds at 210° C.

OREVAC 1 polypropylene, OREVAC 2 polypropylene and OREVAC 3 polypropylene and 3 denote polypropylenes grafted with maleic anhydride (MAH), containing approximately 0.5% by weight of MAH and which have the following characteristics:

|  | Unit | Method | OREVAC 1 polypropylene | OREVAC 2 polypropylene | OREVAC 3 polypropylene |
|---|---|---|---|---|---|
| Melt index 230° C. 2.16 kg | g/10 min | ASTM D 1238 | 2 | 1 | 1.5 |
| 230° C. 5 kg |  |  |  | 4 |  |
| Density | g/cm³ | ASTM D 1505 | 0.89 | 0.9 | 0.9 |
| Melting temperature | ° C. | DSC | 151 | 162 | 161 |
| Vicat point | ° C. | ASTM D 1525 | 122 | 150 | 141 |
| Yield stress | MPa |  |  | 25 | 26 |
| Yield elongation | % | ISO R 527 |  | 13 | 10 |
| Breaking stress | MPa |  | 35 | 20 | 27 |
| Elongation at break | % |  | 550 | >400 | 450 |
| Flexural modulus | MPa | ISO R 178 | 580 | 1000 | 830 |
| Hardness | Shore D | ISO 868 |  | 63 |  | orgalloy 1 denotes a mixture of:

60% by weight of PA-6 of melt index 2–3 (235° C.)

30% by weight of polypropylene of melt index 1.5–2 (235° C.)

10% by weight of an ethylene/propylene backbone copolymer containing 12% by weight of ethylene, grafted with maleic anhydride (1% by weight of anhydride relative to the backbone) and then condensed with a monoamine caprolactam oligomer with a degree of polymerization of 22, the quantity of these oligomers being 25% by weight relative to the backbone.

PP denotes a polypropylene of MI 1 (230° C., 2.16 kg) and MI 4 (230° C., 5 kg) and Shore D hardness 63 (ISO 868).

Example 1

The following 3-layer coating is produced on steel:

Steel/Epoxy per Table 1 (thickness=70 μm)/Orevac per Table 1 (thickness=250–300 μm)/PP containing 20% by weight of short glass fibers (thickness=2.5 mm)

Application Conditions:

Pipe temperature=200–220° C.

(Epoxy/adhesive) time=22–25 seconds (this is the time between the application of the epoxy resin and the application of the Orevac)

(Epoxy/cooling) time=3 minutes

TABLE 1

| | Adhesiveness in N/5 cm | | |
|---|---|---|---|
| Primer | EUROKOTE 714-31PP epoxy resin | EPOXY P405/06 epoxy resin | EPOXY 500 618 epoxy resin |
| Adhesive | OREVAC 1 polypropylene | OREVAC 2 polypropylene | OREVAC 2 polypropylene |
| 80° C. | >1177 | >1138 | >1082 |
| 110° C. | 839 | 860 | 832 |
| 130° C. | 346 | 659 | 653 |
| 150° C. |  | 389 | 352 |

The sample containing EUROKOTE 714-31PP epoxy resin showed parting between steel and epoxy at 130° C.

Example 2

The following 3-layer coating is produced on steel:

Steel/Epoxy per Table 2 (thickness=70 μm)/Orevac per Table 2 (thickness=250–300 μm)/Orgalloy 1 (thickness=2.5 mm)

Application Conditions:

Pipe temperature=200–220° C.

(Epoxy/adhesive) time=22–25 seconds; this is the time between the application of the epoxy resin and the application of the Orevac.

(Epoxy/cooling) time=3 minutes

TABLE 2

| | Adhesiveness in N/5 cm | | |
|---|---|---|---|
| Primer | EUROKOTE 714-31PP epoxy resin | EPOXY P405/06 epoxy resin | EPOXY 500 618 epoxy resin |
| Adhesive | OREVAC 1 polypropylene | OREVAC 3 polypropylene | OREVAC 3 polypropylene |
| 80° C. | 734 | 687 |  |
| 110° C. | 733 | 567 | 613 |
| 130° C. | 602 | 450 | 401 |
| 150° C. | 153 | 196 | 217 |

The sample containing EUROKOTE 714-31PP epoxy resin showed parting between steel and epoxy between 130° C. and 150° C.

Example 3

The following 3-layer coating is produced on steel:

Steel/Epoxy per Table 3 (thickness=70 μm)/Orevac per Table 3 (thickness=250–300 μm)/PP (thickness=2.5 mm)

Application Conditions:

Pipe temperature=200–220° C.

(Epoxy/adhesive) time=22–25 seconds (Epoxy/cooling) time=3 minutes

TABLE 3

| | Adhesiveness in N/5 cm | | |
|---|---|---|---|
| Primer | EUROKOTE 714-31PP epoxy resin | EPOXY P405/06 epoxy resin | |
| Adhesive | OREVAC 1 polypropylene | OREVAC 3 polypropylene | OREVAC 3 polypropylene |
| 80° C. | 1260 | 1033 | 1020 |
| 110° C. | 773 | 807 | 735 |
| 130° C. | 245 | 176 | 518 |
| 150° C. | 80 | 99 | 313 |

The samples containing EUROKOTE 714-31PP epoxy resin showed parting between epoxy and steel at 130° C. and at 150° C. The sample containing EPOXY P405/06 epoxy resin showed PP creep between 130° C. and 150° C.

We claim:

1. A metal surface coated with a thermoplastic polymer, said coated metal surface comprising a coating exhibiting a peel strength at 150° C., according to DIN 30 670, which is at least 160 N/5 cm, said coated metal surface comprising a coating in successive layers:
   a layer comprising an epoxy resin placed against the metal, said epoxy resin having a glass transition temperature 150° C. or higher;
   a layer comprising a binder, said binder comprising polypropylene; and
   a layer comprising a thermoplastic polymer.

2. The coated metal surface of claim 1, in which the binder is a composition comprising polypropylene functionalized by grafting with at least one member selected from the group consisting of unsaturated carboxylic acid, an unsaturated carboxylic acid anhydride and derivatives thereof.

3. The coated metal surface of claim 1, in which the metal surface is the external surface of a pipe.

4. The coated metal surface of claim 2, in which the metal surface is the external surface of a pipe.

5. The metal surface coated with a thermoplastic polymer according to claim 1, wherein the thermoplastic polymer is polypropylene.

6. The metal surface coated with a thermoplastic polymer according to claim 1, wherein the thermoplastic polymer contains short glass fibers.

7. The metal surface coated with a thermoplastic polymer according to claim 1, wherein the thermoplastic polymer is a mixture of a polyamide, polypropylene, and ethylene/propylene backbone copolymer.

8. The metal surface coated with a thermoplastic polymer according to claim 4, wherein said resin has a glass transition temperature higher than 150° C.

9. The metal surface coated with a thermoplastic polymer according to claim 5, wherein the thermoplastic polymer is homopolypropylene.

10. The metal surface coated with a thermoplastic polymer according to claim 5, wherein the polypropylene contains short glass fibers.

11. The metal surface coated with a thermoplastic polymer according to claim 1, wherein the homopolypropylene contains short glass fibers.

12. The coated metal surface of claim 5, in which the metal surface is the external surface of a pipe.

13. The coated metal surface of claim 6, in which the metal surface is the external surface of a pipe.

14. The coated metal surface of claim 9, in which the metal surface is the external surface of a pipe.

* * * * *